(12) United States Patent
Belkhodja et al.

(10) Patent No.: US 8,574,442 B2
(45) Date of Patent: Nov. 5, 2013

(54) METHOD FOR WET OXIDATION OF EFFLUENTS HEATED ESSENTIALLY BY SELF-COMBUSTIBILITY, AND CORRESPONDING INSTALLATION

(75) Inventors: Merzark Belkhodja, Antony (FR); Didier Cretenot, Senlis (FR)

(73) Assignee: Veolia Water Solutions & Technologies Support, Saint Maurice (FR)

( * ) Notice: Subject to any disclaimer, the term of this patent is extended or adjusted under 35 U.S.C. 154(b) by 505 days.

(21) Appl. No.: 12/295,492

(22) PCT Filed: Apr. 13, 2007

(86) PCT No.: PCT/EP2007/053653
§ 371 (c)(1),
(2), (4) Date: Mar. 24, 2009

(87) PCT Pub. No.: WO2007/118867
PCT Pub. Date: Oct. 25, 2007

(65) Prior Publication Data
US 2009/0301974 A1 Dec. 10, 2009

(30) Foreign Application Priority Data
Apr. 19, 2006 (FR) ...................... 06 03455

(51) Int. Cl.
*C02F 1/02* (2006.01)
*C02F 1/72* (2006.01)
(52) U.S. Cl.
USPC .......... 210/750; 210/758; 210/761; 210/765; 210/766

(58) Field of Classification Search
USPC ......... 210/758, 761, 762, 750, 765, 175, 180; 422/198, 200, 208, 242
See application file for complete search history.

(56) References Cited

U.S. PATENT DOCUMENTS

| | | | | |
|---|---|---|---|---|
| 3,852,192 A | * | 12/1974 | Fassell et al. | 210/761 |
| 3,920,548 A | * | 11/1975 | Fassell et al. | 210/761 |
| 4,338,199 A | * | 7/1982 | Modell | 210/721 |
| 4,795,568 A | * | 1/1989 | Chen | 210/761 |
| 4,983,296 A | * | 1/1991 | McMahon et al. | 210/761 |
| 5,540,847 A | * | 7/1996 | Stultz et al. | 210/761 |
| 5,665,242 A | * | 9/1997 | Gallup | 210/696 |
| 5,948,275 A | * | 9/1999 | Djafer et al. | 210/762 |
| 6,210,583 B1 | * | 4/2001 | Kurukchi et al. | 210/638 |
| 2003/0056910 A1 | | 3/2003 | Mullen | |
| 2006/0060541 A1 | | 3/2006 | Abazajian | |

* cited by examiner

*Primary Examiner* — Lucas Stelling
(74) *Attorney, Agent, or Firm* — Coats and Bennett PLLC

(57) ABSTRACT

A method for treating effluent containing dissolved or suspended solids includes directing the effluent containing dissolved or suspended solids to a reactor and oxidizing at least a portion of the dissolved or suspended solids in the reactor with an oxidizing agent. Oxidation is carried out at a temperature ranging between approximately 20° C. and approximately 350° C. and at a pressure ranging between approximately 1 bar and approximately 160 bar. A gaseous phase and a liquid phase form within the reactor during oxidation. The method includes separating the gaseous phase from the liquid phase and heating the effluent in the reactor with the heat produced from the oxidation of the dissolved or suspended solids.

13 Claims, 3 Drawing Sheets

METHOD FOR WET OXIDATION OF EFFLUENTS HEATED ESSENTIALLY BY SELF-COMBUSTIBILITY, AND CORRESPONDING INSTALLATION

This application is a U.S. National Stage Application of PCT Application No. PCT/EP2007/053653, with an international filing date of 13 Apr. 2007. Applicant claims priority based on French patent application No. 0603455 filed 19 Apr. 2006.

The field of the invention is that of the treatment of industrial or domestic effluent containing solid particles, in particular but not exclusively sludge coming from purification stations.

More generally, the invention applies to the treatment of effluents that contain a large proportion of organic matter and/or matter in suspension.

The treatment in question consists in ridding the effluent to be treated of a substantial proportion of the undesirable compounds that it contains with a view to discharging it into a natural receiving environment, a purification station or a system. The effluent in question may be essentially water, but also any other industrial fluid to which the invention can be applied.

Typically, this treatment is implemented in a purification station, and aims to treat the sludge from the process of purifying the wastewater entering the purification station. The treatment converts the sludge into a suspension, the chemical oxygen demand (COD) of which is appreciably reduced. The solid phase of said suspension, which is highly mineralised, can be discharged, and the aqueous phase of the suspension can if the case rises be returned to the head of the purification station.

The purification methods used for treating domestic or industrial effluent conventionally involve biological processes aimed at reducing their biological oxygen demand (BOD) and reproduce the natural phenomena while accelerating them. However, certain effluents have pollutants that are difficult to biodegrade, requiring the use of special methods, and/or frequently requiring the involvement of chemical substrates.

One of the efficient treatments adapted to this type of application is oxidation in a wet environment (or oxidation by wet method, or hydrothermal oxidation) in English WAO (Wet Air Oxidation), (or Hydrothermal Oxidation).

Oxidation in a wet environment is a technique that has been abundantly described in the prior art and in particular in the U.S. Pat. Nos. 4,721,575 and 4,272,383 as well as for example in the French patent FR 2 334 635. This technique aims to achieve a thorough oxidation of the organic matter contained in solutions having a high concentration of organic matter that is not very biodegradable, or not at all. It has been used principally in the context of the treatment of industrial effluent and consists in putting an oxidising gas in contact with said solution at a high temperature while maintaining the solution in the liquid state. For this purpose, the conditions for implementing such a method conventionally lie, with regard to pressure, between approximately 5 and approximately 160 bar, and with regard to temperature between approximately 100° C. and approximately 350° C. The oxidising gas used may in particular be air, air enriched with oxygen or molecular oxygen.

Other treatments exist, in particular methods of purification by activated sludge and physico-chemical precipitation methods. These treatments generally result in the production of residual sludge consisting essentially of insoluble mineral components and non-decomposed organic matter.

In France, the quantity of sludge produced by purification stations is approximately a million tonnes of dry matter per annum. Approximately half of this sludge is reprocessed in agriculture while 35% is stored in dumps.

Following the establishment of new standards with which purified water must comply, the production of purification sludge is becoming more and more important. In parallel, the regulatory provisions organising the storage, agricultural reprocessing or degradation thereof are more and more restrictive, due to the fact that such sludge is liable to present drawbacks for the environment and health because of its nature.

The improvement of treatments, with a view to resolving the problem of sludge, constitutes a technologic challenge to which the present invention affords a family of solutions. The treatment can also in certain cases make it possible to comply directly with discharge or reuse standards.

Conventionally, it has essentially been attempted to treat the sludge separately, independently of the effluent treatment process. This treatment can consist in particular of aerobic stabilisation, anaerobic digestion, dehydration, stabilisation by liming, incineration or composting.

In parallel to these treatments of the excess sludge produced, treatments of reduction at source are beginning to appear.

The aim of these treatments is in particular to reduce the quantity of sludge produced by reducing the quantity of organic matter.

However, in the majority of cases, these methods have a negative influence on the correct functioning of the station.

The main reasons for this bad influence relate to the return to the head of the station of the water issuing from the sludge treatment, which creates an overload in terms of COD as well as nitrate to be eliminated by the station, this overload being able to represent 10% to 30% of the initial load.

In order to attempt to resolve these problems, one solution consists of reinforcing the operating conditions of the treatment of the effluents used, so as in particular to accentuate the mineralisation of the residual sludge and to reduce the pollution load returning to the wastewater treatment system. Thus, in the case of treatments by wet air oxidation (WAO), attempts will be made to reinforce the mineralisation by extending the treatment time, or by increasing the pressure, temperature or concentration of oxidising gases.

However, this strategy tends to make the method very expensive.

In addition, on conventional WAO units, the energy recovery takes place by preheating the effluent to be treated by means of the treated effluent. On domestic sludge, this arrangement makes it possible to recover the reaction heat in order to achieve a functioning that is self-sufficient in energy with sludges at 45 g/l (or 4.5% of dry matter) for fresh sludge to approximately 80 g/l (or 8% dry matter) for digested sludge.

However, the current design of exchangers does not make it possible to work at higher concentration since the viscosity of the sludge becomes very great and the pressure drop in the exchangers increases as well as the risks of fouling.

In addition, functioning at relatively low concentrations limits the acceptable hydraulic flow on a treatment line in particular by an increase in the size of the reactors. Currently, according to the method, the economic limit is situated between 10 and 30 $m^3$/h per line. The treatment of a greater quantity of sludge can take place only through increasing the number of treatment lines. Functioning at these low concentrations generally allows only energy recovery at a very low temperature level, thus limiting the possibilities of recycling to the heating of premises.

Thus, regarding to the characteristics of the sludge, the exchangers must be cleaned at regular intervals (conventionally every week or at best every 2 to 3 months).

It will therefore be understood that the use of exchangers for recovering of the reaction heat remains a brake on the development of this technology.

A system and method for heating and oxidising an effluent containing oxidisable matter in a reactor of the piston type and functioning under supercritical conditions have been described in the prior art.

The heating of the effluent to be treated takes place by mixing with the reaction medium in a piston reactor specially arranged to promote mixing by acting on the differences in density of the two fluids.

According to another technique, a heating system uses the reaction heat in a specific reactor or the transfer of heat takes place in several steps; a step of transfer of heat by mixing the effluent to be treated with an oxidising flow previously heated with the condensation heat of the water evaporated during the oxidation reaction, and a step of indirect heating on an exchanger integrated in the reactor. This configuration is applicable either in a subcritical oxidation system or under supercritical conditions.

The drawback of this technique is that it requires the setting up of specific equipment at the reaction system and that it can only be applied to reactors of the piston type.

In this configuration, the effluent to be treated, which by definition contains a great deal of oxidisable organic matter, is directly put in contact with the oxidant under conditions where the temperature is high (between 500° C. and 600° C.).

In addition, the heating is performed using a reaction mixture that is maintained under supercritical conditions (the pressure being able to vary according to the technique from 220 bar to 700 bar).

There has also been proposed a system for heating the effluent treated with the flash steam obtained during the expansion of the treated effluent. These systems work in batches in a non-oxidising system and require at least two reactors, one using the flash steam produced by the other, which involves a complex and expensive installation.

The objective of the invention is in particular to mitigate the drawbacks of the prior art.

More precisely, the objective of the invention is to propose a method of oxidisation of effluent by wet method, which makes it possible to dispense with the use of the heat exchangers conventionally used for heating effluent, without it being necessary to maintain the reaction mixture under supercritical conditions.

Another objective of the invention is to provide such a method that increases the energy recovery potential of the corresponding installation compared with known installations.

Another objective of the invention is to provide such a method that limits the maintenance operations for the corresponding installation compared with the solutions of the prior art.

Another objective of the invention is to provide such a method that optimises the construction and/or operating costs of the installation.

Yet another objective of the invention is to provide such a method that allows the treatment of effluent continuously.

These objectives, as well as others that will appear subsequently, are achieved by virtue of the invention, the object of which is a method of oxidation of effluent in aqueous phase consisting of causing the said effluent to undergo oxidation in the presence of at least one oxidising agent, at a temperature of between approximately 20° C. and approximately 350° C., at a pressure of between approximately 1 bar and approximately 160 bar, so as to mineralise part of the organic matter and oxidise the ammonia and total nitrogen contained in said effluent, said oxidation being carried out inside a phase-separation reactor in which a gaseous phase is kept above the liquid phase formed by said effluent, said method comprising at least one step of heating said effluent, characterised in that said heating step is essentially carried out within said reactor by the oxidation reaction heat of the organic matter, said heating step being preceded by a step of concentrating said effluent.

The present invention thus allows the elimination of the exchangers used in the prior art and to recover all the reaction heat in the reactor with separation of phases.

This is because the separation within the reactor of the reaction gasses produced by the oxidisation of the organic matter makes it possible to achieve the heating of the effluent to be treated solely by the liquid phase, whilst maintaining them under subcritical conditions.

The oxidant is thus always in contact with a reaction medium with a low organic matter content, which procures a high level of safety on the reactor.

In addition, in such a system, the elimination of the exchangers makes it possible to work with effluent or sludge having dry matter contents very much higher than those generally treated in this type of system. For example, domestic or industrial sludge with proportions of dry matter of between 13% and 16% can be introduced directly into the reactor without prior preheating.

In addition, the invention makes it possible to eliminate the exchangers, and all the maintenance sequences relating to them, such as cleaning sequences in an acidic environment, can be avoided. The availability of the unit is therefore increased.

Moreover, the increase in the concentration also makes it possible to reduce the size of the installations and thus optimise the costs of constructing and operating such units.

It should be noted that, by virtue of the invention, the reaction medium keeps all its sensible heat and the non-use or partial use of the sensible heat of the reaction medium for heating the effluent to be treated increases the potential for energy recovery. This is because the reaction mixture coming from the reactor is at the reaction temperature and a major part of the sensible heat of this mixture discharged from the reactor can be used for producing energy in its various forms (steam, thermal fluid or electricity) at a sufficient energy level to increase the possibilities of recycling.

It should also be noted that, with a method according to the invention, the heat necessary for starting can easily be introduced by fitting on the reactor a double jacket with the circulation of a hot fluid such as thermal oil or steam, or by direct injection of steam within the reactor.

According to one advantageous solution, said oxidation is conducted in a reactor of the infinitely mixed type.

The association of such a reactor of the infinitely type with the method according to the invention considerably increases the safety on this type of unit.

Advantageously, the said sludge concentration step is conducted so as to obtain effluent comprising between approximately 4% and approximately 20% dry matter.

Preferentially, said sludge concentration step is performed so as to obtain effluent comprising approximately 15% dry matter.

According to an advantageous solution, said concentration is obtained by the dilution of dehydrated or thick sludge in said effluent.

According to an advantageous variant, said sludge concentration is obtained by the return, to said effluent, of a liquid phase issuing from a step of settling of said treated effluent.

According to a particular embodiment, the method comprises a step of preheating said effluent upstream of said reactor.

Thus, for effluent having lower concentrations of organic matter than those lying between 13% and 16% of dry matter as mentioned previously, a step of preheating of the effluent might be necessary for reaching the operating temperature in the reactor solely by the oxidation heat of the organic matter. In this case, the preheating of the effluent to be treated may be done without the addition of an exchanger upstream of the reactor but only by mixing with steam produced by a partial expansion of the reaction medium carried out at the discharge from the reactor in separate equipment.

It should be noted that, in the embodiment according to which the said oxidation step is carried out in the absence of a catalyst, this is partially compensated by an increase in the residence time.

According to another embodiment, said oxidation step is conducted in the presence of a homogeneous metal catalyst belonging to the group comprising manganese, iron, cobalt, nickel, copper, zinc and the mixtures and compounds of one or more of them.

In this case, said catalyst is preferentially a soluble compound of copper or zinc or a mixture thereof, and advantageously copper sulphate.

According to a variant adapted to a treated effluent comprising a solid phase, the method comprises a step consisting of recycling at least part of the solid phase present in said oxidation reactor.

It should be noted that the recycling operation does not mean that said recycled solid phase fraction must necessarily emerge from the reactor before being reintroduced therein. Recycling of the solid phase means only that at least a portion of said solid phase separated is reused within the reactor during at least one new wet air oxidation (continuously or discontinuously).

Advantageously, a step of recirculation of said effluent in the reactor is carried out during said wet air oxidation.

Such a step ensures sufficient contact time for allowing oxidation of the organic part of the effluent.

The invention also concerns an installation for implementing a method of oxidation in aqueous phase of effluent consisting of causing the effluent to undergo oxidation in the presence of at least one oxidising agent, at a temperature of between approximately 20° C. and approximately 350° C., at a pressure of between approximately 1 bar and approximately 160 bar, so as to mineralise part of the organic matter and to oxidise the ammonia and total nitrogen contained in said effluent, said oxidation being carried out inside a phase separation reactor in which a gaseous phase is provided above the liquid phase consisting of said effluent, said installation comprising means of heating said effluent, characterised in that it comprises means for the energetic recovery of steam obtained by flash expansion of said liquid phase, designed so as to achieve said heating within said reactor and means of concentrating said effluent promoting its spontaneous combustibility.

Preferentially, said reactor is of the infinitely mixed type.

Other features and advantages of the invention will emerge more clearly while reading the following description of a preferential embodiment of the invention given by way of illustration and non-limitatively, and the accompanying drawings, among which:

As mentioned previously, the principle of the invention lies in carrying out an oxidation of effluent in a reactor by wet method by seeking, within this reactor, a spontaneous combustibility of the effluent, by increasing the concentration thereof. If the organic concentration of the effluent is not sufficient, the method according to the invention also provides for energy recovery by flash expansion of the reaction liquid, which produces steam used for heating, by direct contact, the effluent to be treated.

Figure 1:
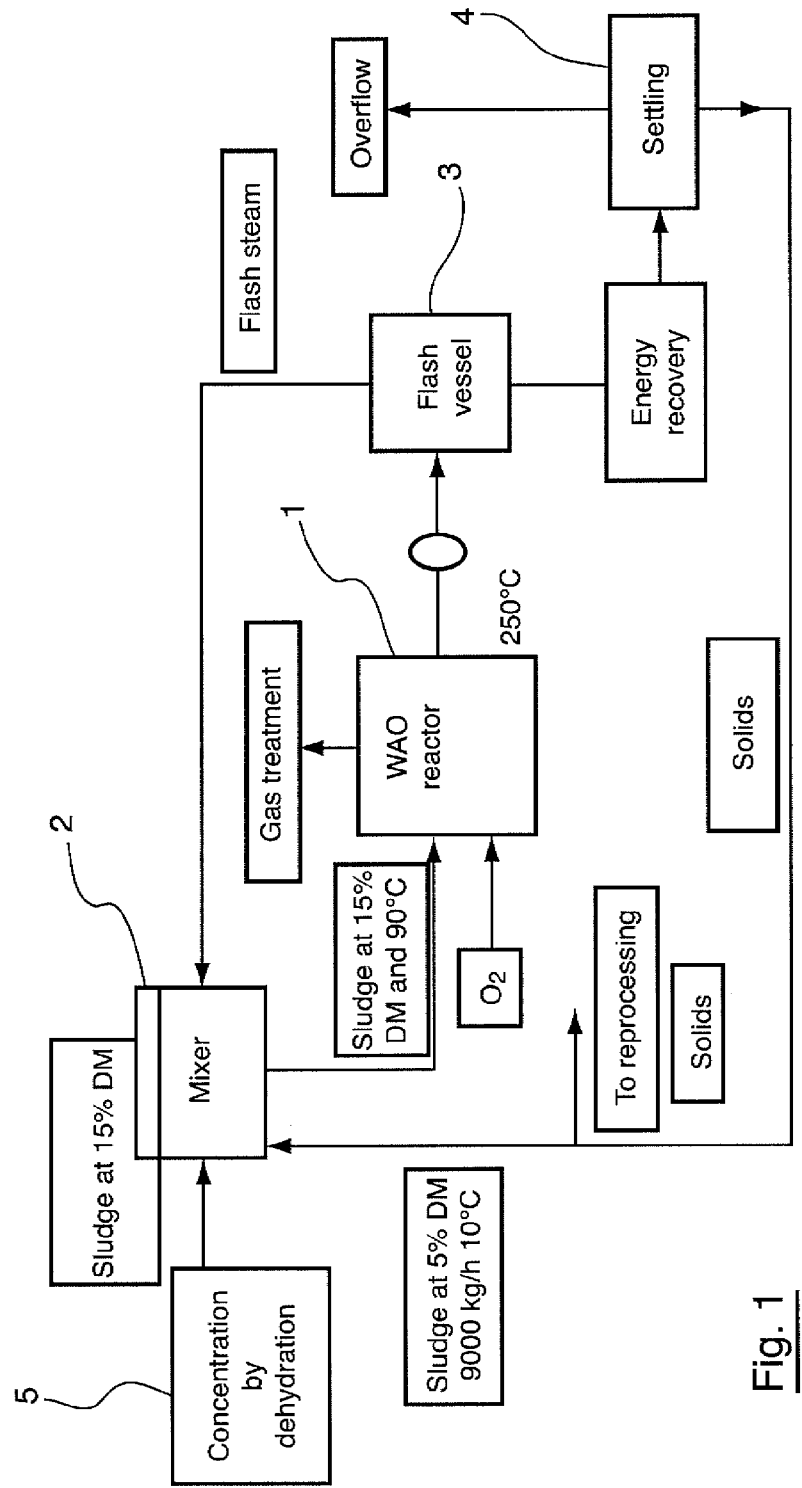
FIG. 1 is a schematic representation of an installation for implementing the method according to the invention.

With reference to FIG. 1, the effluent undergoes oxidation by wet method in a reactor 1, in the presence of a homogeneous catalyst and an oxidising agent (in this case oxygen) at a temperature ranging between 20° C. and 350° C. and at a pressure ranging between 1 bar and 160 bar so as to mineralise part of the organic matter and the ammonia nitrogen of the effluent to be treated.

It should be noted that oxidation by wet method can also be conducted in the absence of a catalyst. This absence of catalyst may be compensated by an increase in the residence time.

The reactor is a phase separation reactor inside which a gaseous phase is provided above the liquid phase. Preferentially, the reactor is of the infinitely mixed type (it should be noted however that the method according to the invention can be applied to any type of reactor).

According to the present embodiment of the invention, an effluent concentration step, for example using dehydration means 5, is carried out upstream of the mixer 2.

Figure 2:
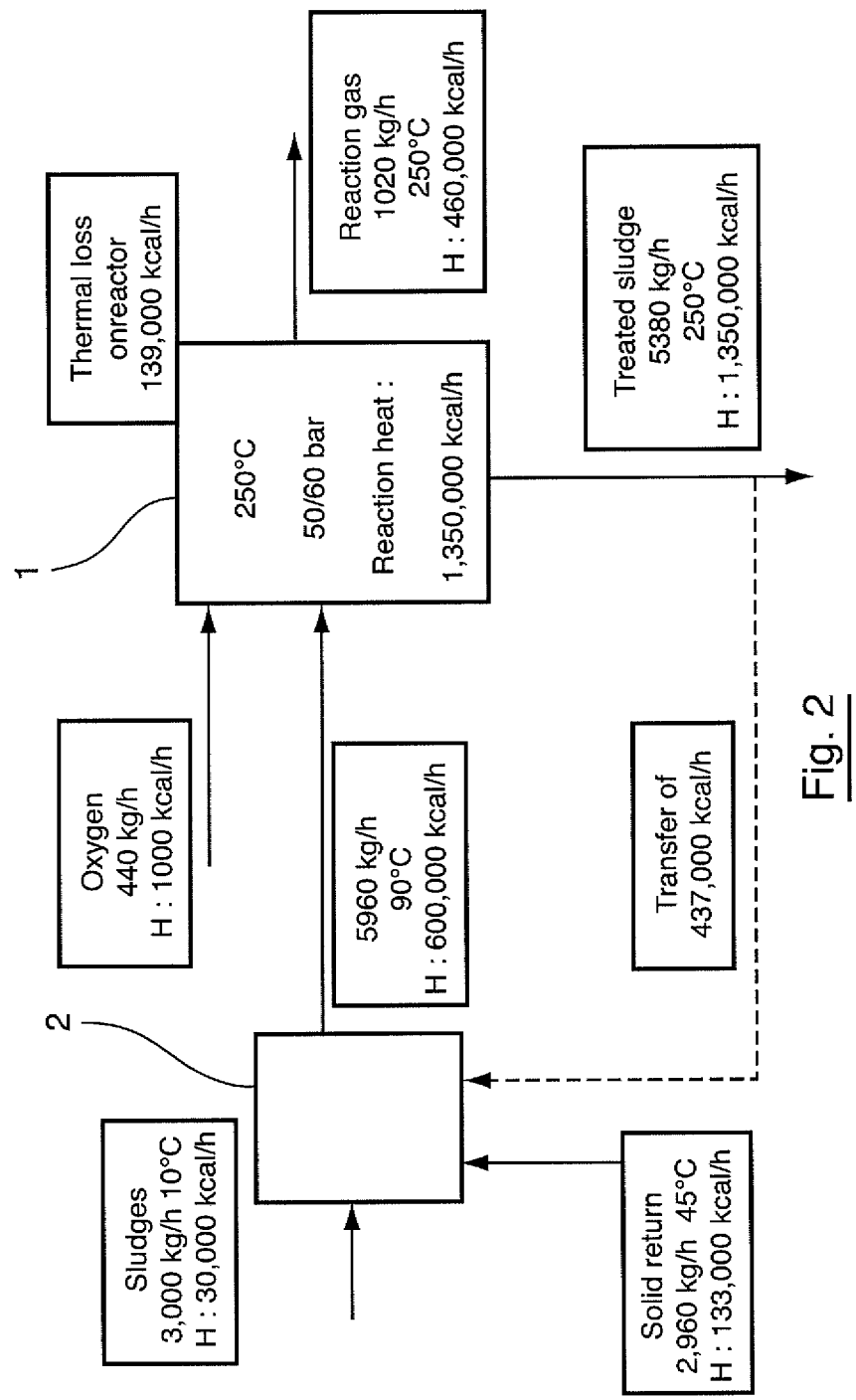
FIG. 2 is a schematic representation of the particular thermal balance of the method according to the invention.

According to an example illustrated by FIG. 2, this concentration step is carried out so as to cause the proportion of dry matter in the effluent to change from 5% to 15%.

The effluent is heated in the mixer 2 by injection of the flash steam obtained by means of an expansion or flash vessel 3.

The mixer 2 thus enables the effluent to be heated if its organic concentration is not sufficient without having recourse to exchanger technology, but also makes it possible to recycle part of the mineralised solid phase in order to increase the residence time of the solids compared with the residence time of the water.

Preferentially, the effluent concentration step is conducted so as to introduce into the mixers effluent having approximately 15% dry matter and more generally between 4% and 20% with an organic matter content of between 40% and 90% with respect to the volatile materials and more preferentially around 60%.

The settling carried out by means of the settler 4 (downstream of the wet-method oxidation reactor) makes it possible to obtain an overflow corresponding to the hygienised liquid phase, and a solid phase partly recirculated to the mixer 2, another part being intended to be reprocessed.

It should be noted that the mixing step can also be carried out by feedback, in the effluent to be treated, of an overflow part obtained at the end of the settling step.

According to a variant, the effluent to be treated is preheated in the mixer by means of the flash steam stored in the vessel 3 and recirculated to the mixer 2.

Preferably the catalyst injected into the reactor is copper sulphate, or more generally a soluble compound of copper or zinc, or even more broadly a homogeneous metal catalyst such as manganese, iron, cobalt, nickel, copper, zinc or mixtures and compounds of one or more of these.

It should be noted that the method includes, according to the present embodiment, a step of recirculating the effluent in the reactor during the oxidation by wet method.

According to the example illustrated by FIG. 2, sludge at 10° C. is introduced at the rate of 3000 kg/h (representing an enthalpy H of 30,000 kg/h) in the mixer 2.

This sludge is injected into the reactor after only heating at 80/90° C. This heating can be carried out simply by heating the sludge in an agitated tank equipped with a double jacket with circulation of hot water, or as shown in FIG. 2 by mixing the sludge with flash steam obtained during the expansion of the treated effluent from the operating pressure to a pressure of around 7 bar, or by temperature recycling of the solids.

Energy recovery is also possible on the step of cooling the treated sludge.

The treated sludge emerges from the reactor at the reaction temperature (250° C.) and part of the sensible heat can be used for heating the sludge to be treated according to the devices mentioned above, and another part used for producing energy in the form of steam or hot thermal fluid.

In the case described above, the sensible heat of the treated sludge would make it possible to obtain for example approximately 650 kg/h of 6-bar steam from boiler water at 105° C.

The sludge at approximately 90° C. issuing from the mixing (representing an enthalpy of approximately 600,000 kcal/h) is injected into the reactor within which a temperature of approximately 250° C. is maintained, at a pressure of 50/60 bar, producing an oxidation reaction heat of 1,350,000 kcal/h, by the injection of oxygen into the reactor at 440 kg/h, and which represents an enthalpy of 1000 kcal/h.

Oxidation by wet method produces a reaction gas at 250° C. at the rate of 1020 kg/h, that is to say an enthalpy of 460,000 kcal/h).

A thermal loss is noted in the reactor corresponding to 139,000 kcal/h.

The treated sludge is discharged from the reactor at a temperature of 250° C. and at a rate of 5380 kg/h, these representing an enthalpy of 1,350,000 kcal/h.

A transfer of the flash steam produced in the reactor in the direction of the mixers is carried out, this steam having an energy yield of 437,000 kcal/h.

It should be noted that a step of recirculation of the solid phase at 45° C. in the direction of the mixture is carried out at the rate of 2960 kg/h, for an enthalpy of 133,000 kcal/h.

As already indicated, the principle of the invention lies in heating the effluent within the reactor by the use of the effluent reaction heat.

Indeed, taking the above example, the enthalpy balance around the reactor shows clearly that the temperature within the reactor is maintained by virtue of the reaction heat of the organic matter.

This balance is as follows:
incoming enthalpy=enthalpy of the effluent after mixer 2: 600,000 kcal/h+enthalpy of $O_2$ (1,000 kcal/h)+oxidation reaction heat=1,350,000 kcal/h that is to say a total of 1,951,000 kcal/h;
outgoing enthalpy=reaction gas enthalpy (460,000 kcal/h)+thermal loss of reactor (139,000 kcal/h)+reaction mixture enthalpy at 250° C. (1,350,000 kcal/h), that is to say in total an enthalpy of 1,949,000 kcal/h.

Figure 3:
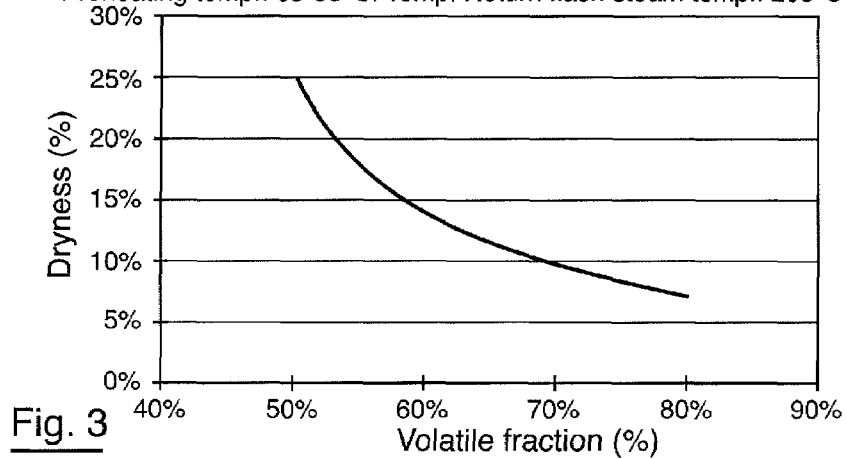
FIG. 3 is a curve indicating the dryness to be obtained according to the volatile fraction of the effluent in order to obtain spontaneous combustibility.

The curve in FIG. 3 shows the dryness of the effluent to be obtained in order to obtain spontaneous combustibility by use of the reaction heat according to the volatile fraction (or volatile matter content VM), this for a net calorific value (NCV) of the VM of 5,200 kcal/kg of VM, for solids returns at 125 g/l, at a reaction temperature of 250° C., for a preheating temperature of between 65° C. and 85° C. and for a flash steam temperature of 200° C.

Clearly, as long as the effluent is maintained under conditions corresponding to the curve in FIG. 3, the effluent is spontaneously combustible.

Figure 4:
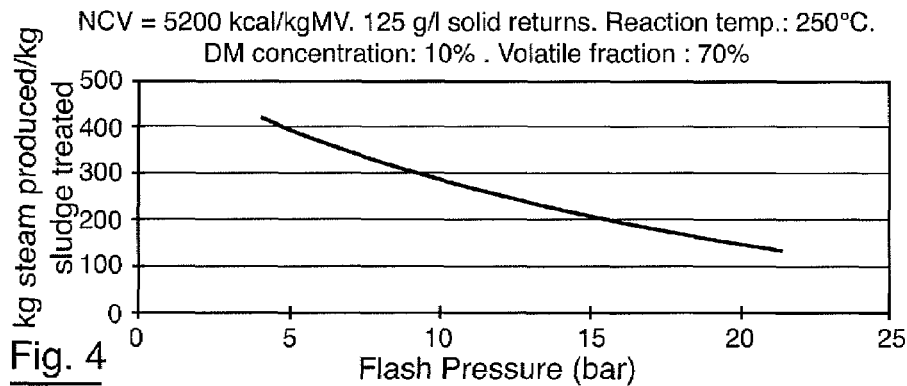
FIG. 4 is a curve indicating the quantity of steam recoverable according to the flash expansion.

The curve in FIG. 4 indicates the quantity of steam recoverable by flash expansion under the same conditions of NCV, solids return and reaction temperature as indicated previously, for a dry matter (DM) concentration in the effluent of 10% and a volatile fraction of 70%.

Figure 5:
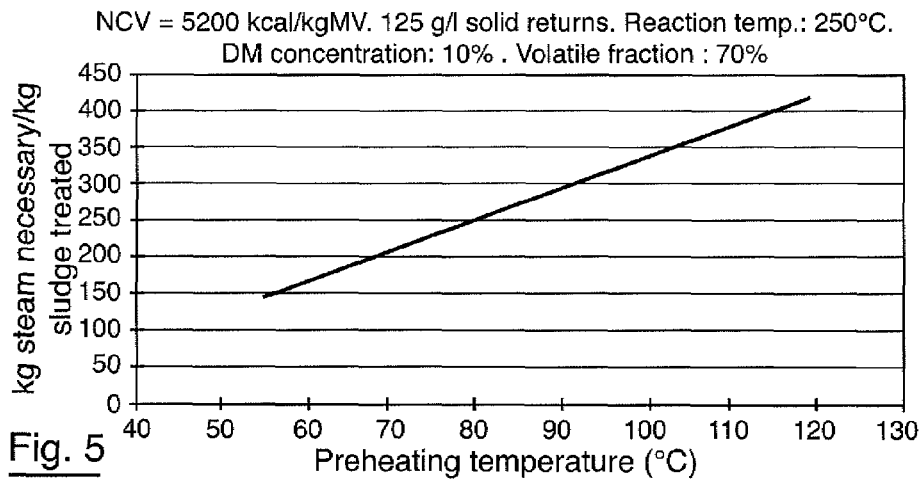
FIG. 5 is a curve indicating the quantity of steam necessary for heating the supply of effluent.

This flash steam is then used to heat the supply. The curve in FIG. 5 gives the quantity of steam necessary for heating the supply.

These three curves together therefore show that a DM concentration of sludge for supplying sufficient reaction heat to maintain the temperature of the reactor corresponds to a given VM content and heating temperature. They also show that the flash steam produced by the expansion of the reaction mixture is easily sufficient to ensure the heating of the incoming sludge at a given temperature.

Thus the temperature of the reactor is maintained without having recourse to noble energy and in particular without using exchanger technology with all the drawbacks that this may represent.

On the contrary, it is still possible to produce energy in a form allowing a very wide range of use.

The invention claimed is:

1. A method for treating a liquid effluent containing dissolved or suspended solids, the method comprising:
concentrating the liquid effluent to produce a concentrated liquid effluent having approximately 4% to approximately 20% dry matter;
directing the concentrated liquid effluent having a temperature at or below 90° C. and containing organic matter to a phase separation reactor, wherein the concentrated liquid effluent has not been heated with an indirect heat exchanger prior to entering the phase separation reactor;
oxidizing at least a portion of the organic matter in the effluent in the phase separation reactor with an oxidizing gas at a temperature ranging between approximately 100° C. and approximately 350° C. and at a pressure ranging between approximately 1 bar and approximately 160 bar, wherein oxidizing at least the portion of organic matter in the effluent forms a gaseous phase and produces heat;
separating the gaseous phase from the effluent throughout the phase separation reactor and generally maintaining the gaseous phase separate from the effluent in the phase separation reactor;
heating the effluent in the phase separation reactor with the heat produced from the oxidation of the organic matter;
directing a treated liquid effluent from the reactor to a steam production unit and producing steam; and
heating the effluent with the steam in a mixing tank such that the effluent directed into the reactor has a temperature at or below 90° C.

2. The method of claim 1 wherein after separating the gaseous phase from the effluent, the effluent contains organic matter that was not oxidized in the reactor and the method further comprises directing the effluent containing the organic matter from the reactor to a settling tank and settling at lest a portion of the organic matter in the settling tank.

3. The method of claim 2 further comprising:
directing the effluent into a mixing tank prior to directing the effluent to the reactor;
directing at least a portion of the organic matter from the settling tank to the mixing tank; and
concentrating the effluent in the mixing tank by mixing the effluent with the organic matter in the mixing tank.

4. The method of claim 2 further comprising recirculating at least a portion of the organic matter in the effluent from the settling tank to the reactor.

5. The method of claim 1 further comprising concentrating the effluent such that the effluent contains approximately 15% dry matter.

6. The method of claim 1 further comprising prior to oxidizing the organic matter in the effluent in the reactor, heating the effluent in the reactor by circulating a hot fluid around the reactor.

7. The method of claim 6 wherein the hot fluid comprises thermal oil or steam.

8. The method of claim 1 further comprising prior to oxidizing the organic matter in the effluent in the reactor, heating the effluent in the reactor by injecting steam into the reactor.

9. The method of claim 1 further comprising oxidizing the organic matter in the effluent in the presence of a catalyst.

10. The method of claim 9 wherein the catalyst is selected from the group consisting of manganese, iron, cobalt, nickel, copper, zinc, or compounds or mixtures comprised thereof.

11. The method of claim 10 wherein the catalyst is copper sulfate.

12. The method of claim 1 wherein the reactor is an infinitely mixed reactor.

13. The method of claim 1 further comprising:
after producing steam, directing the effluent from the steam producing unit to a settling tank and settling at least a portion of the organic matter remaining in the effluent in the settling tank; and
mixing the organic matter from the settling tank with the effluent in the mixing tank.

* * * * *